United States Patent
Wong

(10) Patent No.: US 11,629,613 B2
(45) Date of Patent: Apr. 18, 2023

(54) GAS TURBINE ENGINE SHAFT BREAK MITIGATION

(71) Applicant: ROLLS-ROYCE plc, London (GB)

(72) Inventor: Natalie C Wong, Bristol (GB)

(73) Assignee: ROLLS-ROYCE plc, London (GB)

( * ) Notice: Subject to any disclaimer, the term of this patent is extended or adjusted under 35 U.S.C. 154(b) by 350 days.

(21) Appl. No.: 16/744,622

(22) Filed: Jan. 16, 2020

(65) Prior Publication Data
US 2020/0248582 A1 Aug. 6, 2020

(30) Foreign Application Priority Data
Feb. 4, 2019 (GB) ...................... 1901516

(51) Int. Cl.
*F01D 21/14* (2006.01)
*F01D 21/00* (2006.01)
*F02C 9/20* (2006.01)

(52) U.S. Cl.
CPC ........... *F01D 21/14* (2013.01); *F01D 21/003* (2013.01); *F02C 9/20* (2013.01); *F05D 2220/323* (2013.01); *F05D 2270/09* (2013.01)

(58) Field of Classification Search
CPC ..................................................... F01D 21/14
See application file for complete search history.

(56) References Cited

U.S. PATENT DOCUMENTS

| | | | | |
|---|---|---|---|---|
| 4,539,809 A * | 9/1985 | Stanley | .................... | F02C 7/232 60/39.094 |
| 4,581,888 A * | 4/1986 | Schmitzer | ............. | F04D 27/001 60/794 |
| 9,371,779 B2 * | 6/2016 | Belghagi | ................... | F02C 9/28 |
| 2006/0042226 A1 | 3/2006 | Trumper et al. | | |
| 2012/0317955 A1 * | 12/2012 | Rowe | ..................... | F01D 21/06 60/39.01 |
| 2013/0152600 A1 * | 6/2013 | Rowe | ..................... | F01D 21/00 60/779 |

(Continued)

FOREIGN PATENT DOCUMENTS

| EP | 1574699 A1 | 9/2005 |
|---|---|---|
| EP | 2053231 A2 | 4/2009 |
| EP | 3103969 A1 | 12/2016 |

OTHER PUBLICATIONS

May 20, 2020 European Search Report issued in European Patent Application No. 20151649.9.

(Continued)

*Primary Examiner* — Arun Goyal
*Assistant Examiner* — William L Breazeal
(74) *Attorney, Agent, or Firm* — Oliff PLC

(57) ABSTRACT

A method of controlling a gas turbine engine includes the steps of: detecting a shaft break event in a shaft connecting a compressor of the gas turbine engine to a turbine of the gas turbine engine; and in response to this detection, activating a shaft break mitigation system which introduces a fluid into a gas flow of the gas turbine engine downstream of the turbine, or increases an amount of a fluid being provided into the gas flow of the gas turbine engine downstream of the turbine, whereby the fluid reduces an effective area of a nozzle for the gas flow so as to reduce the mass flow rate of the gas flow through the turbine.

11 Claims, 2 Drawing Sheets

(56) References Cited

U.S. PATENT DOCUMENTS

Figure 1:
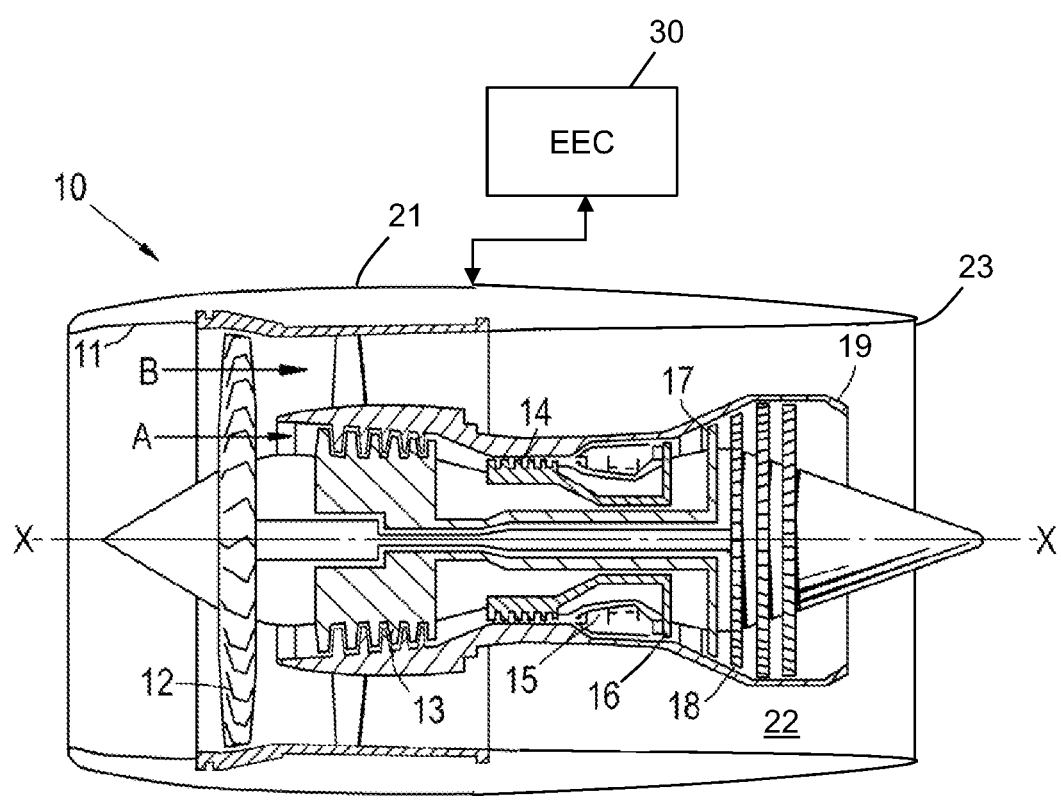

| | | | | |
|---|---|---|---|---|
| 2013/0312423 | A1* | 11/2013 | Bacic | F01D 21/045 |
| | | | | 60/779 |
| 2016/0010479 | A1* | 1/2016 | Rice | F01D 17/02 |
| | | | | 415/118 |
| 2017/0254295 | A1 | 9/2017 | Moster et al. | |
| 2017/0284306 | A1* | 10/2017 | Negri | F02C 9/18 |
| 2018/0010465 | A1* | 1/2018 | Xu | F01D 5/186 |
| 2020/0231307 | A1* | 7/2020 | Best | G01L 15/00 |

OTHER PUBLICATIONS

Jul. 17, 2019 British Search and Examination Report issued in British Patent Application No. 1901516.3.

\* cited by examiner

GAS TURBINE ENGINE SHAFT BREAK MITIGATION

This disclosure claims the benefit of UK Patent Application No. GB 1901516.3, filed on 4 Feb. 2019, which is hereby incorporated herein in its entirety.

The disclosure relates to shaft break mitigation in a gas turbine engine.

Modern gas turbine engines generally have up to three compressor-turbine groups, also referred to as spools, connected by respective coaxial shafts. These compressor-turbine groups are responsible for the compression and expansion of core gas passing through the engine.

For example, the Rolls-Royce Trent 1000 aerospace gas turbine engine has three compressor-turbine groups: the low pressure compressor-turbine group, the intermediate pressure compressor-turbine group, and the high pressure compressor-turbine group. Each of these has a corresponding compressor and turbine. In the case of the low pressure compressor-turbine group, the low pressure compressor is generally referred to as the fan.

It is possible, during operation of the gas turbine engine, for a shaft connecting a compressor and turbine pair to mechanically fail. The breakage in the shaft leads to an instantaneous decoupling between the turbine and its respective compressor. As a result the compressor may decelerate rapidly, as it is no longer driven by the turbine, and the turbine may accelerate rapidly, as it is no longer driving the compressor.

The rapid acceleration of the turbine is particularly concerning, as over-speed events can lead to disintegration of the turbine, including possibly bursting of the turbine disc, and further damage to the gas turbine engine.

It is important then to rapidly take the appropriate action when a shaft break occurs.

Accordingly, in a first aspect, there is disclosed a method of controlling a gas turbine engine, the method including the steps of:
  detecting a shaft break event in a shaft connecting a compressor of the gas turbine engine to a turbine of the gas turbine engine; and
  in response to this detection, activating a shaft break mitigation system which introduces a fluid into a gas flow of the gas turbine engine downstream of the turbine, or increases an amount of a fluid being provided into the gas flow of the gas turbine engine downstream of the turbine, whereby the fluid reduces an effective area of a nozzle for the gas flow so as to reduce the mass flow rate of the gas flow through the turbine.

Advantageously, such an introduction of, or increase in, a supply of a fluid into the downstream gas flow can reduce the gas flow through the turbine after a shaft break event has been detected. The terminal speed of the turbine can therefore be reduced, as there is less energy in the gas flow to drive the (now decoupled) turbine. Correspondingly, a risk of disc burst of the turbine is also reduced for a given turbine weight. Alternatively, the weight of the turbine could be decreased so as to maintain its terminal speed at a predetermined level.

The method of the first aspect may have any one, or, insofar as they are compatible, any combination, of the following optional features.

The gas flow of the gas turbine engine downstream of the turbine may be a turbine exhaust gas flow.

The fluid is typically a liquid, but may be a gas (for example, bypass airflow or a bleed). When the fluid is a liquid, the liquid may be fuel. Thus the introduction of the liquid into the gas flow of the gas turbine engine downstream of the turbine, or increase in an amount of the liquid being provided into the gas flow of the gas turbine engine downstream of the turbine may be performed by modification of a fuel schedule. The fuel schedule may be modified by an electronic engine controller.

The gas turbine engine may include a reheat system, and the fluid may be reheat fuel provided from one or more spray nozzles of the reheat system. The activation of the shaft break mitigation system may increase a pumping rate of the reheat fuel to increase the amount of reheat fuel being provided. The increase in the amount of reheat fuel being provided may be such that a fuel-air ratio (FAR) causes the one or more nozzles to flood.

The gas turbine engine may include, preliminary to the detecting and activating steps, the steps of predicting a likely occurrence in the future of a shaft break in the shaft, and in response to this prediction, priming the shaft break mitigation system. Priming the shaft break mitigation system may include priming one or more pumps operable to pump the fluid.

Activation of the shaft break mitigation system may also include varying a geometry of a nozzle so as to further reduce the effective area of the nozzle. The nozzle may comprise one or more petals, and varying the geometry of the nozzle may include moving the nozzle petals.

In a second aspect, the disclosure provides a gas turbine engine, comprising:
  an engine core comprising a turbine, a compressor, and a shaft system connecting the turbine to the compressor; and
  an electronic engine controller;
  wherein the electronic engine controller is configured to, in response to detecting a shaft break event, activate a shaft break mitigation system which introduces a fluid into a gas flow of the gas turbine engine downstream of the turbine, or increases an amount of a fluid being provided into the gas flow of the gas turbine engine downstream of the turbine, whereby the fluid reduces an effective area of a nozzle for the gas flow so as to reduce the mass flow rate of the gas flow through the turbine.

Advantageously, such an introduction of, or increase in, a supply of a fluid into the downstream gas flow can reduce the gas flow through the turbine after a shaft break event has been detected. The terminal speed of the turbine can therefore be reduced, as there is less energy in the core gas flow to drive the (now decoupled) turbine. Correspondingly, a risk of disc burst of the turbine is also reduced for a given turbine weight. Alternatively, the weight of the turbine could be decreased so as to maintain its terminal speed at a predetermined level.

The gas turbine engine of the second aspect may have any one, or, insofar as they are compatible, any combination, of the following optional features.

The gas flow of the gas turbine engine downstream of the turbine may be a turbine exhaust gas flow.

The fluid is typically a liquid, but may be a gas (for example, bypass airflow or a bleed). When the fluid is a liquid, the liquid may be fuel. Thus the introduction of the liquid into the gas flow of the gas turbine engine downstream of the turbine, or increase in an amount of the liquid being provided into the gas flow of the gas turbine engine downstream of the turbine may be performed by modification of a fuel schedule. The fuel schedule may be modified by the electronic engine controller.

The gas turbine engine may include a reheat system, and the fluid may be reheat fuel provided from one or more spray nozzles of the reheat system. The reheat system may include a pump for pumping reheat fuel, and the electronic engine controller may be configured to increase the amount of reheat fuel being provided by increasing a pumping rate of the pump. The increase in the amount of reheat fuel being provided may be such that a fuel-air ratio (FAR) causes the one or more nozzles to flood.

The gas turbine engine may include a shaft break prediction system which predicts a likely occurrence in the future of a shaft break in the shaft, and in response to the shaft break prediction system predicting a likely occurrence in the future of a shaft break in the shaft, the electronic engine controller may be configured to prime the shaft break mitigation system. The electronic engine controller may be configured to prime the shaft break mitigation system by activating one or more pumps operable to pump the fluid.

The gas turbine engine may include a nozzle having a variable geometry, and the electronic engine controller maybe further configured to perform a step, in response to the detection of a shaft break event, of further reducing the effective area of the nozzle by varying the geometry of the nozzle. For example, the nozzle may comprise one or more petals, and varying the geometry of the nozzle may include moving the nozzle petals.

In a third aspect, the disclosure provides an aircraft including the gas turbine engine of the second aspect.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect.

Figure 2:
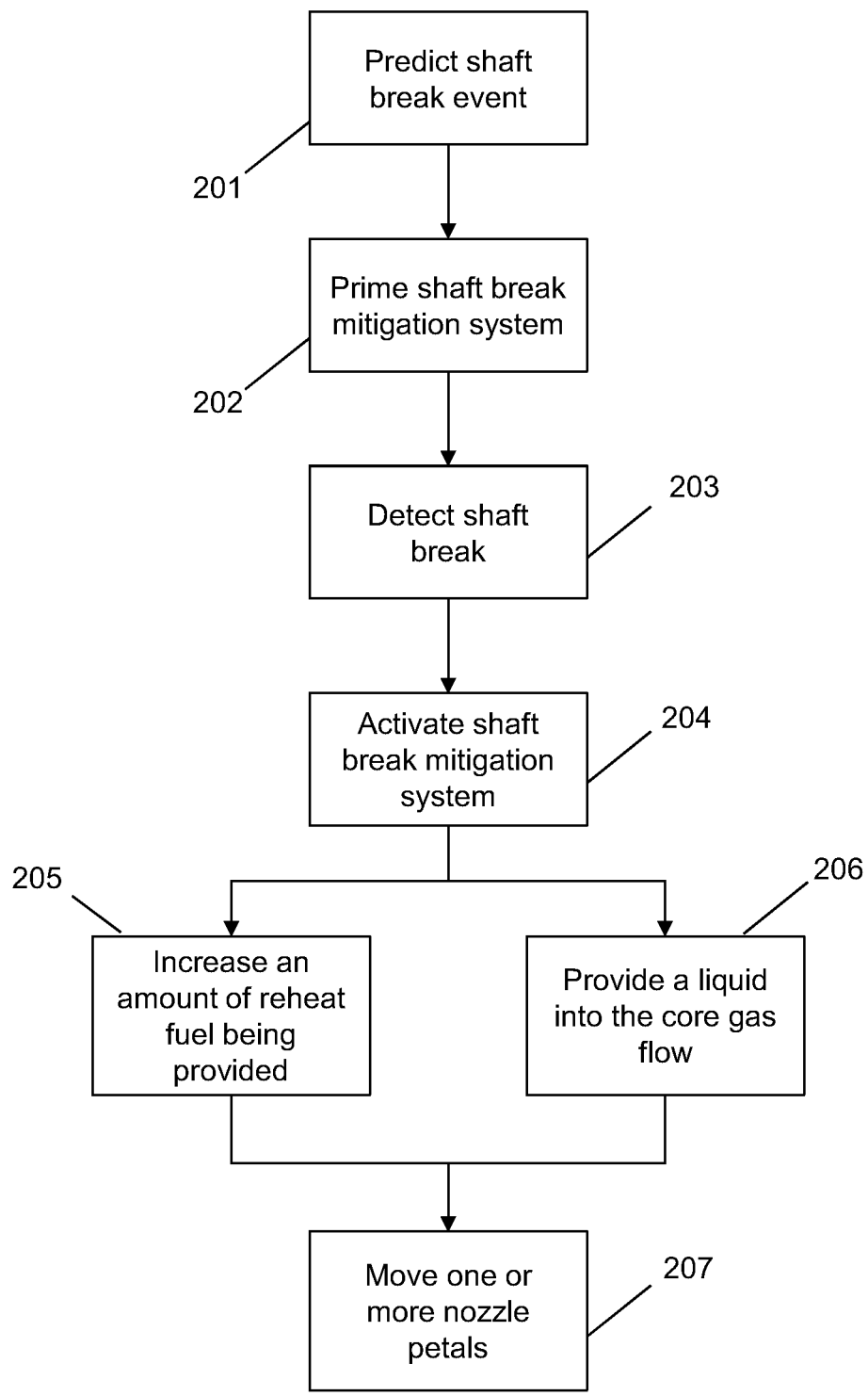

FIG. 1 shows a longitudinal cross-section through a ducted fan gas turbine engine; and FIG. 2 shows a method according to the present disclosure.

With reference to FIG. 1, a ducted fan gas turbine engine is generally indicated at 10 and has a principal and rotational axis X-X. The engine comprises, in axial flow series, an air intake 11, a propulsive fan 12 (also referred to as a low pressure compressor), an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first core gas flow A into the intermediate-pressure compressor 13 and a second gas flow B which passes through the bypass duct 22 to provide propulsive thrust. The intermediate-pressure compressor 13 compresses the core gas flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

In at least one example of the present disclosure, the gas turbine engine includes a reheat or afterburner system. The reheat system is operable to introduce additional fuel into the gas flow downstream of the last turbine (e.g. the low pressure turbine). This additional, or reheat, fuel is combusted and therefore the velocity of the exhaust gas is increased, leading to an increase in the thrust provided by the gas turbine engine.

Shaft break refers to a mechanical failure in the interconnecting shaft linking a compressor with a turbine, for example, the shaft linking the compressor fan 12 with the low pressure turbine 18. Various techniques for detecting shaft break are known to the skilled person. Detection of a shaft break can be achieved, for example, by measuring the rotational speeds of the compressor and the corresponding turbine. A difference in these rotational speeds can be indicative that they are no longer coupled, i.e. the shaft that connected them has broken.

A method according to the present disclosure is shown in FIG. 2. The method is used to control a gas turbine engine operating in the manner discussed above and may be performed by an electronic engine controller 30 connected to or integral with the gas turbine engine. In an initial, optional, step (step 201) a shaft break prediction system may predict that a shaft break is about to occur.

In response to this prediction, step 202 is performed whereby a shaft break mitigation system is primed. In one example, this priming may be performed by priming one or more pump operable to pump a liquid used in the shaft break mitigation system. In an example where the gas turbine engine includes a reheat system which is, at a time where a shaft break is predicted, not being used, the pumps may be pumps associated with the reheat system. Alternatively, the pumps may be pumps associated with a dedicated shaft break mitigation system (i.e. where the liquid used is not reheat fuel).

Next, in step 203, a break is detected in a shaft connecting a compressor of the gas turbine engine to a turbine of the gas turbine engine. As has been noted previously, this detection can be performed in many different ways using methods known in the art.

In response to this detection, in step 204, a shaft break mitigation system is activated. In an example where the gas turbine engine includes a reheat system which is, at the time of activation of the shaft break mitigation system, being used, the method moves to step 205 whereby the amount of reheat fuel being provided to the reheat system is increased. The amount of reheat fuel being provided should be sufficient as to flood the nozzle(s) of the reheat system, i.e. the FAR should be high enough to flood the nozzle(s). Increasing the amount of fuel being provided may be performed by modifying a fuel schedule in or controlled by the electronic engine controller.

Alternatively if either: there is no reheat system, or the reheat system is inactive at the time of activation of the shaft break mitigation system, then the method moves to step 206 and a liquid is provided into the core gas flow downstream of the turbine. This liquid can be, in the case of a reheat system being present but inactive, reheat fuel, or it can be a separate liquid or fluid provided for use in the mitigation system.

In all cases, the amount of liquid present downstream of the turbine increases as a result of the activation of the shaft break mitigation system. As a result of this, the effective area of a nozzle for the gas flow, downstream of the turbine, decreases and therefore reduces the mass flow rate of the gas flow through the turbine. Correspondingly, the energy imparted to the turbine by gas passing therethrough also reduces, which can reduce the terminal speed of the turbine.

A further, optional, step 207 may be performed after either of steps 205 and 206, wherein a variable geometry nozzle has its geometry varied so as to further reduce the effective area of the nozzle. For example, one or more nozzle petals of the gas turbine engine (located downstream of the turbine, e.g. towards exhaust 19) are moved to further reduce the effective area of the nozzle.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

What is claimed is:

1. A method of controlling a gas turbine engine, the method including steps of:
    detecting a break has occurred in a shaft connecting a compressor of the gas turbine engine to a turbine of the gas turbine engine; and
    in response to the detecting, activating a shaft break mitigation system which introduces a fluid into a core gas flow of the gas turbine engine downstream of the turbine, wherein the fluid is different from a reheat fuel for a reheat system, or
    increases an amount of the fluid being provided into the core gas flow of the gas turbine engine downstream of the turbine,
    whereby the fluid reduces an effective area of a nozzle for the core gas flow so as to reduce a mass flow rate of the core gas flow through the turbine.

2. The method of claim 1, wherein the method further includes, preliminary to the detecting and activating steps, steps of:
    predicting a likely occurrence in the future of a shaft break in the shaft, and
    in response to the predicting, priming the shaft break mitigation system.

3. The method of claim 2, wherein the priming of the shaft break mitigation system includes priming one or more pumps operable to pump the fluid.

4. The method of claim 1 wherein the activating of the shaft break mitigation system also includes varying a geometry of a nozzle so as to further reduce the effective area of the nozzle.

5. A gas turbine engine, comprising:
    an engine core comprising a turbine, a compressor, and a shaft system connecting the turbine to the compressor; and
    an electronic engine controller, wherein
    the electronic engine controller is configured to, in response to detecting a break has occurred in the shaft system, activate a shaft break mitigation system which introduces a fluid into a core gas flow of the gas turbine engine downstream of the turbine, wherein the fluid is different from a reheat fuel for a reheat system, or
    increases an amount of the fluid being provided into the core gas flow of the gas turbine engine downstream of the turbine, whereby the fluid reduces an effective area of a nozzle for
    the core gas flow so as to reduce a mass flow rate of the core gas flow through the turbine.

6. The gas turbine engine of claim 5, wherein the gas turbine engine includes a shaft break prediction system which predicts a likely occurrence in the future of a shaft break in the shaft, and wherein in response to the shaft break prediction system predicting a likely occurrence in the future of a shaft break in the shaft, the electronic engine controller is configured to prime the shaft break mitigation system.

7. The gas turbine engine of claim 6, wherein the electronic engine controller is configured to prime the shaft break mitigation system by activating one or more pumps operable to pump the fluid.

8. The gas turbine engine of claim 5, wherein the gas turbine engine includes a nozzle having a variable geometry, and the electronic engine controller is further configured to perform a step, in response to the detecting of the shaft break event, of further reducing the effective area of the nozzle by varying a geometry of the nozzle.

9. An aircraft, including the gas turbine engine of claim 5.

10. A non-transitory computer readable storage medium storing a computer program comprising code which, when run on a computer, causes the computer to perform the method as claimed in claim 1.

11. A computer system programmed to perform the method as claimed in claim 1.

\* \* \* \* \*